C. W. DAVIS.
Grain Drier.
No. 14,494.
Patented March 25, 1856.
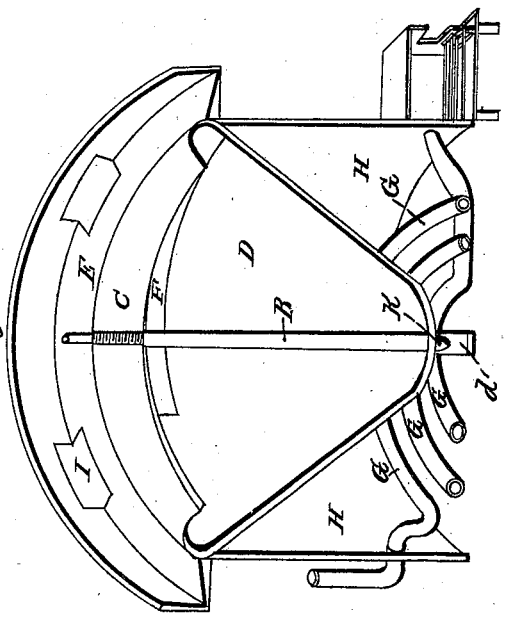
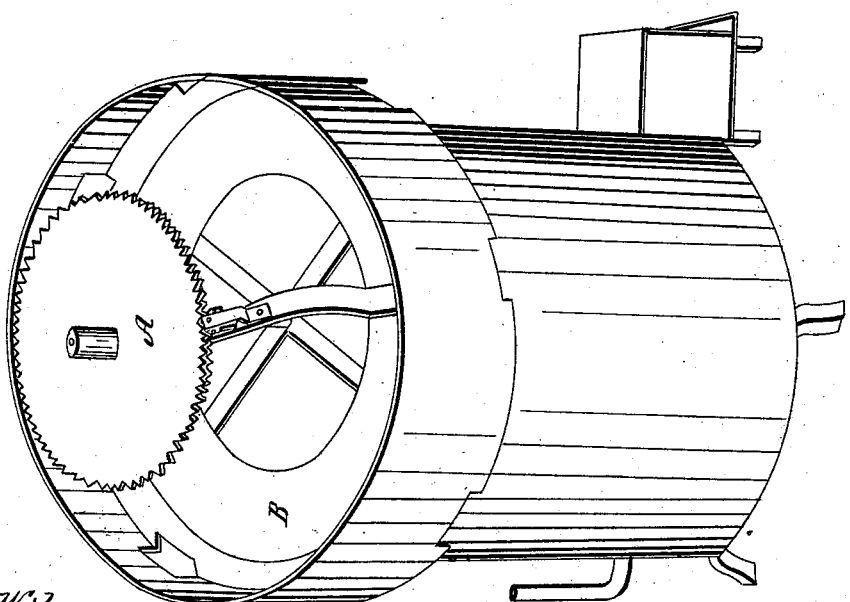
Witnesses.
James P. McLean
Anne S. McLean
Inventor:
Charles W. Davis

UNITED STATES PATENT OFFICE.

CHS. W. DAVIS, OF NEWARK, NEW JERSEY.

FRUIT OR GRAIN DRIER.

Specification of Letters Patent No. 14,494, dated March 25, 1856.

*To all whom it may concern:*

Be it known that I, CHARLES W. DAVIS, of the city of Newark, in the county of Essex and State of New Jersey, have invented a new and useful Improvement in the Construction of Centrifugal Fruit or Grain Driers; and I hereby declare the following to be a full, clear, and exact description of the construction and operation of the same, reference being had to the accompanying drawings, which drawings are lettered to correspond with and make a part of this specification.

*Description.*—Figure 1, is an oblique top, and side view, of my apparatus; letter (A) represents the power employed to operate the inverted cone (B) by means of a crank or pulley.

Fig. 2, is a vertical sectional view showing the shaft (B,) which passes through the center of the earthen cone (D,) resting upon its lower end, (that is in the socket) at (J,) upon which it revolves when operated upon by the cogged gearing (A,) Fig. 1. The cone (D,) is fastened around the shaft (B,) at (k;) hence when the shaft revolves, it carries the cone with it; and any fruit, or grain, coffee, etc. being placed inside of this inverted cone, around the shaft (B,) must inevitably be flung off from it (the shaft) by centrifugal force, and thus spread over the inner surface of the cone (D,) which is composed of one third common potter's claiy, one third of burnt clay, one sixth of common lime, and one sixth of saw dust, well mixed and properly burned, the saw dust is destroyed by the action of the fire while burning, hence leaves the material more porous, and better adapted to absorb the moisture from the fruit &c. than any metallic cylinder ever used at the same time preventing any injurious chemical change upon the fruit by the action of the acid, when coming in contact with the metal.

Letter (C,) forms the top, or rim, around the upper or large end of the cone (D,) turned in toward the center or shaft (B,) this rim should form a parabolic curve, as near as possible, in order that when the grain or fruit, which is forced up the inclined sides of the cone (which should be less than forty five degrees) reaches the top or rim (C,) by which means it is carried back toward the center, and falls down near the bottom or small end of the cone. After the grain or fruit is sufficiently dried, the top or rim (C,) may be taken off the cone, by simply unscrewing it, and then a few turns of the crank will at once discharge the contents of the cone (D,) into the rim (E,) that forms the top of the outer jacket, or cylinder (H, H,) that surrounds the inverted cone or drying chamber. A hoop, or rib (F,) may be used to throw the grain back toward the center if required. The cone is kept hot by means of round or square joints of pipe as shown at (G, G,) which radiates sufficient heat to dry the contents of the cone without burning. This heat is produced or generated in the stove.

I do not claim the separate parts of the above apparatus as my invention, but I believe their combination as applied for the purpose of drying fruit, or grain, to be novel, and useful.

What I claim, and desire to secure by Letters Patent of the United States, is—

The inverted earthen cone (D,) Fig. 2, having an adjustable parabolic rim (C) with or without the hoop (F,) operating substantially as described, and for the purposes specified.

CHARLES W. DAVIS.

Witnesses:
JAMES P. McLEAN,
ANNE S. McLEAN.